US006801836B2

(12) United States Patent
Schanin

(10) Patent No.: US 6,801,836 B2
(45) Date of Patent: Oct. 5, 2004

(54) POWER-CONSERVATION SYSTEM BASED ON INDOOR/OUTDOOR AND AMBIENT-LIGHT DETERMINATIONS

(75) Inventor: David J. Schanin, San Carlos, CA (US)

(73) Assignee: USA Technologies, Inc., Malvern, PA (US)

( * ) Notice: Subject to any disclaimer, the term of this patent is extended or adjusted under 35 U.S.C. 154(b) by 132 days.

(21) Appl. No.: 09/899,499

(22) Filed: Jul. 5, 2001

(65) Prior Publication Data

US 2003/0009264 A1 Jan. 9, 2003

(51) Int. Cl.[7] .......................... G05D 11/00; G05D 23/00
(52) U.S. Cl. ........................... 700/295; 700/297; 62/89; 307/39
(58) Field of Search ........................... 315/151; 307/39; 62/89; 700/286, 295, 296, 297, 240, 242

(56) References Cited

U.S. PATENT DOCUMENTS

| 4,587,459 A | * | 5/1986 | Blake ........................... 315/158 |
| 5,270,802 A | * | 12/1993 | Takagi et al. .................. 348/655 |
| 5,990,628 A | * | 11/1999 | Birrell ........................... 315/151 |
| 6,243,626 B1 | * | 6/2001 | Schanin ........................ 700/286 |
| 6,389,822 B1 | * | 5/2002 | Schanin ........................... 62/89 |

\* cited by examiner

Primary Examiner—Leo Picard
Assistant Examiner—Douglas S. Lee
(74) Attorney, Agent, or Firm—RatnerPrestia

(57) ABSTRACT

A refrigerated vending machine provides separate power conservation modes for the cooling system and the panel lights. Power conservation for the panel lights takes into account whether the vending machine is located indoors or outdoors. The location can be indicated by a setting by the vending machine operator or may be determined automatically according to maximum brightness or color temperature. If the vending machine is outdoors, the panel lights are turned off when the ambient is bright (to save energy when the panel lights are not needed) and turned on when the ambient is dark (to attract customers). If the vending machine is indoors, the panel lights are turned off when the ambient is dark (since the room is presumably vacant) and turned on when the ambient is bright (indicating the room is in use). Optionally, an occupancy sensor can be used to turn off the panel lights if the room light is on but no one has been detected in it. The cooling system uses a conservation mode in which circulation fans are switched off so only items in a position to be dispensed first or second are kept at the desired temperature.

26 Claims, 2 Drawing Sheets

POWER-CONSERVATION SYSTEM BASED ON INDOOR/OUTDOOR AND AMBIENT-LIGHT DETERMINATIONS

BACKGROUND OF THE INVENTION

The present invention relates to electrical power control and, more particularly, to the automated control of power to a load A major objective of the invention is to conserve energy usage by vending machines.

Recent events have given urgency to what has always been a good idea: energy conservation. Energy conservation can be implemented simply by turning off power from appliances that are not in use. While power control can be done manually, e.g., people can turn off appliances when they are done using them and turn off lights as they leave a room, automated power control plays an important role in energy conservation.

Timers can be used to control power delivery. For example, business lights can be turned on automatically at the start of a business day and turned off automatically at its close. Alternatively, timers can control the duration for which an appliance is active. For example, a timer might turn off a hot-air hand dryer after a fixed time; anyone wanting more time can reset the hand dryer. Many appliances, such a printers, enter a low-power "sleep" mode after a set period of non-use.

Ambient-light sensors can be used to control certain appliances. For example, street lamps can be activated in low-light conditions, and deactivated when morning brings sufficient light that the artificial illumination is not required. Motion sensors, such as occupancy sensors, can be used to supply power only when people are present. Security lights often combine ambient-light detection and motion detection. During the day, the lights remain off regardless of motion in their vicinity; however, at night, motion triggers the lights on.

Vending machines, particularly those that are refrigerated, pose special problems when it comes to energy conservation. Typically, a vending machine owner-operator places a vending machine in operation on the premises of another, and visits as necessary to refill the vending machine. The owner of the premises typically pays for the electricity consumed by the vending machine, and thus may have the biggest interest in saving power; however, the premises owner may be limited to unplugging the vending machine to save power during time of low usage.

However, unplugging or switching off a refrigerated vending machine can have the undesirable consequence that the vending items may warm up. In extreme cases, this may cause items to spoil. However, even where spoilage is not a problem, customers might have the unpleasant experience of, for example, a warm soda if they purchase soon after the vending machine is turned on. Also, unplugging or switching off a vending machine risks losing sales and customers.

Copending U.S. patent application Ser. No. 09/579,411 discloses a vending machine with active and power-conservation modes. An occupancy sensor can be used to activate the system from power-conservation mode when a potential customer is in the vicinity. The cooling strategy ensures that a customer obtaining an item, even after a power-conservation period, will receive a properly chilled item. Thus, sales and customer satisfaction are maintained.

One issue regarding the active and power-conservation modes for a refrigerated vending machine is what to do with panel lights. Many vending machines include panel lighting to attract the attention of potential customers and indicate that the vending machine is operational. If the panel lighting is off in a power-conservation mode, fewer potential customers will be drawn to purchase from the vending machine. On the other hand, if the panel lighting remains on during power-conservation mode, the energy savings will be less than it could be. So there remains an issue of how to control vending machine panel lighting to optimize the tradeoff between functionality and energy-conservation.

SUMMARY OF THE INVENTION

The present invention provides an appliance with a power conservation scheme that takes both location (indoor versus outdoor) and ambient light into account in controlling a load. In the context of a vending machine, the load can be the panel lighting. In the context of a refrigerated vending machine, the power-conservation scheme for the panel lighting is distinct from the power-conservation scheme for the cooling system.

The indoor-versus-outdoor determination governs how ambient light is used to control panel lighting. If the room that the vending machine is in is dark, it is usually unoccupied; since no potential customers are present, power can be withheld from the lights to conserve energy. Potential customers are more likely to be present if the room is artificially illuminated—especially if conservation measure is in place for room lighting. Accordingly, power is supplied to the panel lights in the context of indoor lighting. For situations where a room remains lit even when it is unoccupied for extended periods of time, an occupancy sensor can be used to turn of panel lights after a predetermined duration of vacancy.

If the machine is outdoors, the relatively bright conditions even in the shade can "wash out" panel lighting; to save energy, power can be withheld from the panel lighting under bright outdoor conditions. However, when it is dark outside, power can be supplied to the panel lighting to attract potential customers.

The indoor-versus-outdoor determination can be made in several ways. The simplest method is to have an operator (human) set the indoor-versus-outdoor mode, for example, as part of the vending machine installation procedure. However, automatic indoor-versus-outdoor location can be detected automatically as well. For example, very bright maximum ambient light can be used to indicate outdoor conditions. Alternatively, color temperature can be used to distinguish natural (outdoor) and artificial (indoor) lighting sources; sunlight tends to be relatively blue, while incandescent lights tend to be relatively red and fluorescent lights tend to be relatively green. In a preferred realization, an operator can select among indoor, outdoor, and automatic modes. The default is automatic mode, so if the operator neglects to select a mode, correct determination of location mode is still probable.

The present invention provides enhanced energy conservation for a refrigerated vending machine, as well as other devices. Since the panel lights can be controlled separately from the cooling system of a refrigerated vending machine, the lights can be on while the cooling system is conserving power and the cooling system can be cooling while the lights are off. This allows the energy-conservation to be optimized separately for the lights and the cooling system, for greater overall conservation.

Location detection allows outdoor operation to be, in a sent, inverted from indoor operation. Outdoors, the lights are on when the ambient is dark, while, indoors, the lights are off when the ambient is dark. Thus, power conservation for the panel lights is optimized for each location. These and other features and advantages of the invention are apparent from the description below with reference to the following drawings.

DESCRIPTION OF THE PREFERRED EMBODIMENTS

Figure 1:
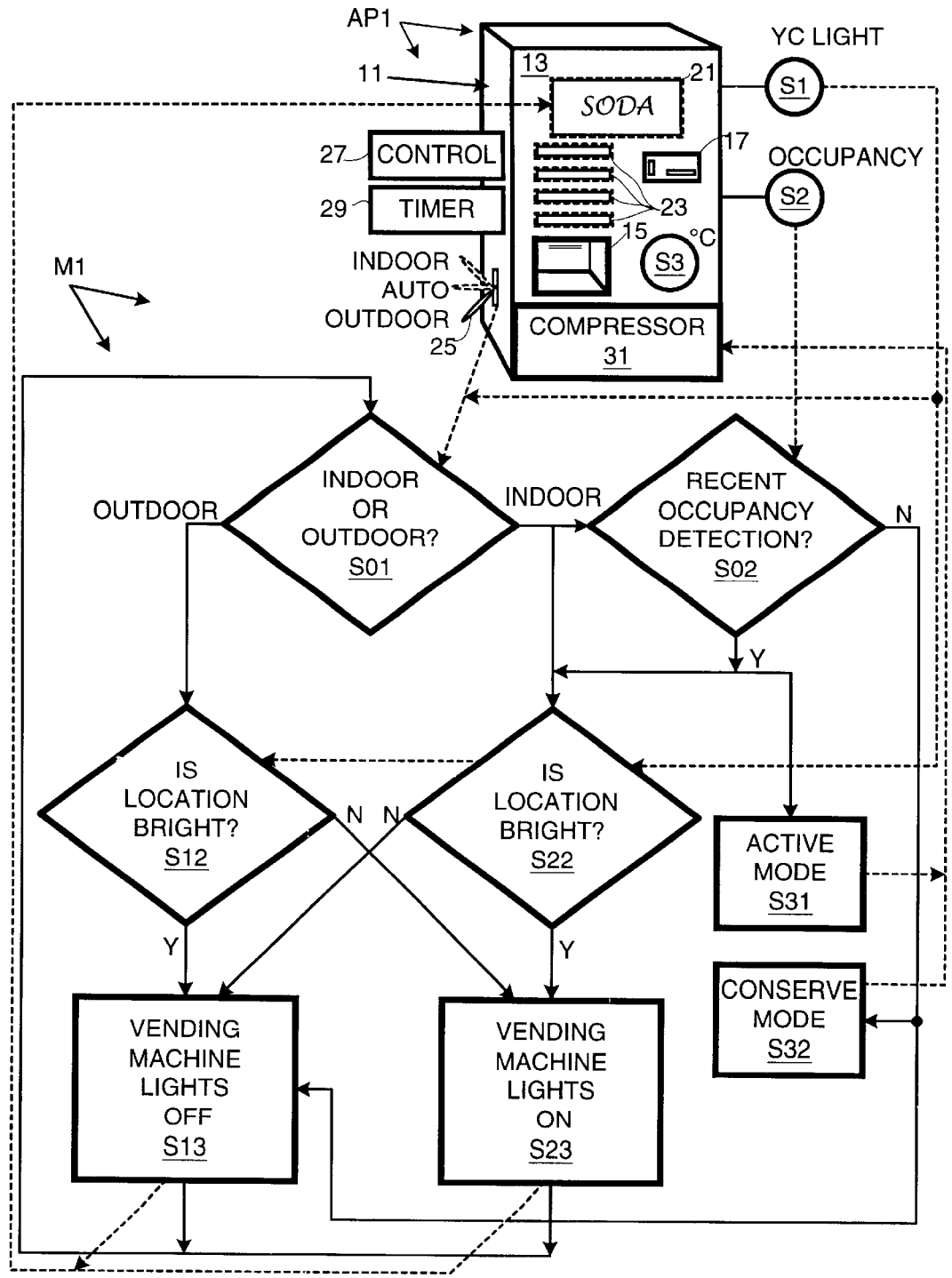
FIG. 1 is a combined block and flow chart of a vending machine and method in accordance with the present invention.

In accordance with the present invention, a refrigerated vending machine AP1 comprises a housing 11 with a front panel 13, a dispensing receptacle 15, money slots 17, an illuminated banner 21, four illuminated item-selection buttons 23, a location-mode switch 25, a controller 27, a timer 29, a compressor 31, and sensors S1, S2, and S3, as shown in FIG. 1. Sensor S1 is an ambient light sensor that provides both luminance (intensity) and chrominance (color) readings. Sensor S2 is a motion-based occupancy sensor. Sensor S3 senses the internal temperature of vending machine AP1, and thus of its dispensable items.

Controller 27 implements two power-conservation schemes, one for the cooling system and one for the panel lights, which include banner 21 and buttons 23. The power-conservation scheme for the cooling system is described in greater detail below. The power-conservation method M1 for the panel lights is flow-charted in FIG. 1.

The rationale for method M1 is that, when a vending machine is outdoors, bright ambient daylight washes out the panel lights, so they might as well be off to save energy. However, at evening and night, the panel lights should be on to attract customers. Indoors, artificial lights are on "for business"; thus, the panel lights should be on to attract customers. A dark room generally means business is closed, so the panel lights can be off to save energy. If someone comes into a dark room, presumably they will switch on a light, in which case, the panel lights will also turn on. However, even with indoor room lights on, the panel lights can be switched off if the occupancy sensor indicates the vicinity of the vending machine is vacant.

At step S01, an indoor-versus-outdoor determination is made, as indicated by the dashed arrow from switch 25 to step S01. Preferably, location-mode switch 25 has been properly set so that it indicates the location manually. Typically, when a vending machine is installed or updated, an operator programs the vending machine with pricing data. At this point, the operator can simply set switch 25 either to the indoor position or to the outdoor position as appropriate. Optionally, the auto-location switch position can be used, in which case the location is automatically determined as described further below. In any event, controller 27 receives the indoor-versus-outdoor determination.

If the location is "outdoors", then a brightness determination is made at step S12. Controller 27 makes the brightness determination based on ambient light data from sensor S1. If the location is bright, the panel lights are turned or kept off at step S13, as indicated by the dashed arrow from step S13 to banner 21. If, at step S12, it is determined to be dark, the vending machine lights are turned or kept on at step S23, as indicated by the dashed arrow from step S23 to banner 21.

If at step S01, the location is determined to be outdoors, a vacancy determination is made a step S02. This determination is made using data from occupancy sensor S2, as indicated by the dashed arrow from occupancy sensor S2 to step S02. In addition, timer data is used, as the vacancy criterion is for no occupancy detection for some time, e.g., 15 minutes. If the vacancy criterion is met, the vending machine is turned or kept off at step S13. If there is recent occupancy (within the most recent 15 minutes), method M1 proceeds to step S22.

At step S22, a brightness determination is made. This brightness determination is made using data from sensor S1. In the illustrated embodiment, the same brightness threshold is used for step S22 as for step S21. However, further refinement allows separate brightness thresholds to be set respectively for each of steps S12 and S22. If at step S22, the location is bright, the lights are turned or kept on at step S23; if the location is dark, the lights are turned or kept off at step S13.

Optionally, step S02 can be omitted. In that case, an indoor determination at step S01 leads directly to step S22, with the same results as above. The difference is that the lights are turned or kept off only if the location is dark; occupancy is ignored.

The cooling system is controlled concurrently with the panel lights. In vending machine AP1, the cooling system toggles between an "active mode" and a "conservation mode" based on occupancy. Specifically, occupancy triggers and maintains the cooling system in active mode, while vacancy for 15 minutes triggers conservation mode. In either mode, compressor 31 is controlled as a function of the internal temperature indicated by sensor S3. However, in active mode, fans circulate air within housing 11 so that the dispensable items are uniformly maintained at an optimal chilled temperature. In contrast, in conservation mode, the fans are turned off and the colder air sinks to the bottom where the next items to be dispensed are located. While these items are maintained within an optimal temperature range, those "further up the stack" are allowed to exceed optimal temperature. The assumption is that at most a few items will be purchased while vending machine AP1 is in conservation mode. This method can be modified by forcing active mode just before the start of period of expected high traffic to ensure all items are at optimal temperature.

Note that the schemes for conserving power with the cooling system and the panel lights are largely independent. The cooling system is controlled in part as a function of internal temperature, while the panel lights are not. The panel lights are controlled as a function of location and ambient light, while the cooling system is not.

As a result, both the active and the conservation modes of the cooling system can be concurrent with any of the four light-control modes: indoor dark, indoor bright, outdoor dark, and outdoor light. Likewise, the compressor can be on or off in any of these modes. The independence is qualified in that, in bright indoor conditions, an occupancy detection can trigger both the active mode of the cooling system and turn on the panel lights. Likewise, in dark indoor conditions, vacancy can cause the lights to be turned off and can trigger conservation mode for the cooling system.

Figure 2:
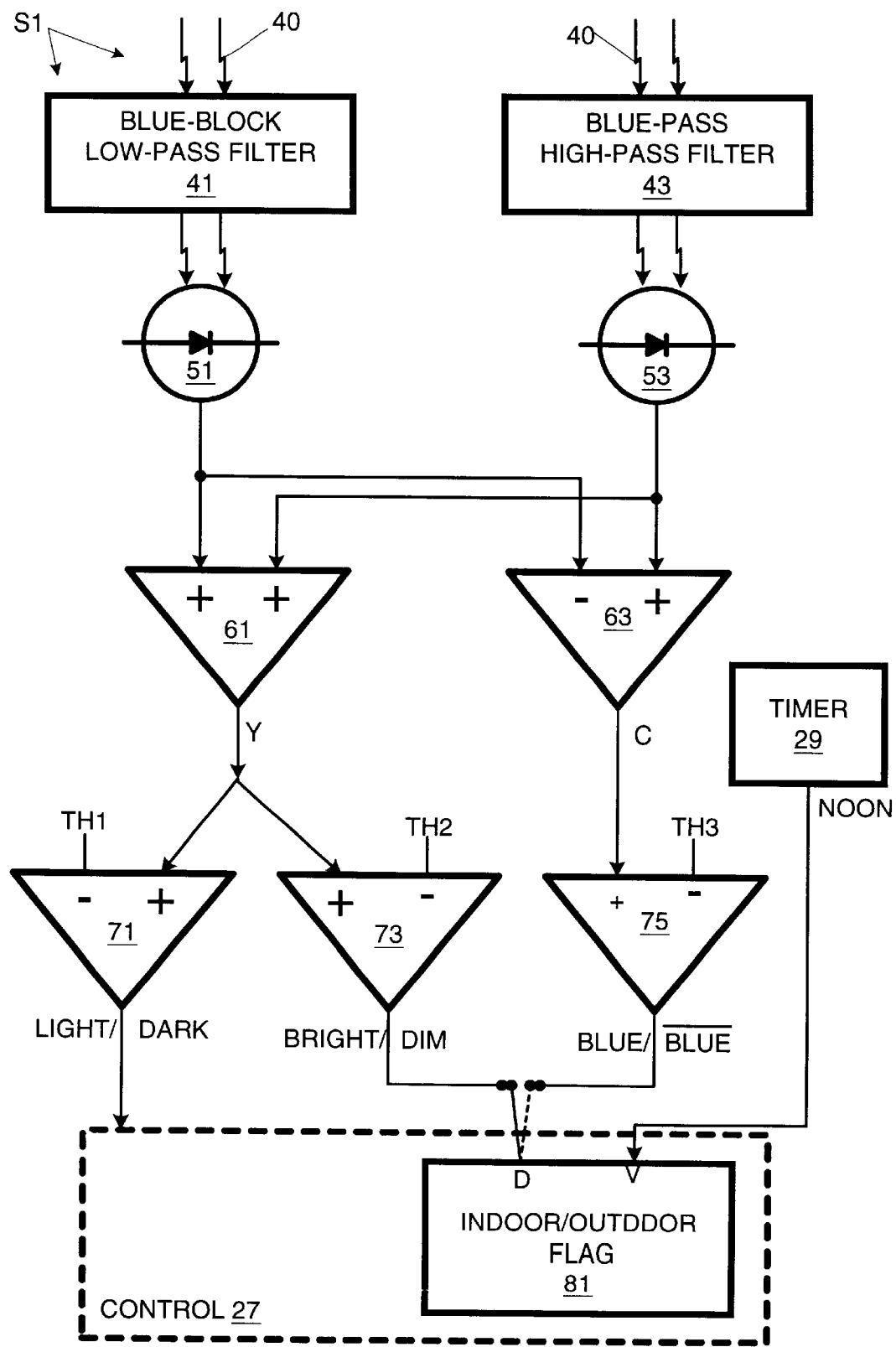
FIG. 2 is a signal flow diagram for a control system of the vending machine of FIG. 1.

In addition to the manual settings for indoor and outdoor locations, vending machine AP1 provides for two automatic modes of location detection. The signal flow is indicated in FIG. 2. A blue-block low-pass filter 41 and a blue-pass high-pass filter 43 filter ambient light 40. The filtered light impinges on respective photodiodes 51 and 53. Photodiode 51 outputs a signal indicating the low frequency, red-green component of the incident light, while photodiode 53 outputs a signal indicating the high-frequency blue component of the incident light.

The photodiode outputs are input to a summing amplifier 61 and a differential amplifier 63. The output of summing amplifier 61 corresponds roughly to the intensity or luminance Y of the ambient light. The output of differential amplifier 63 corresponds roughly to the one dimensional chrominance of the ambient light. Typically, sunlight is bluer than incandescent or fluorescent light, so the chrominance can be used to distinguish indoor and outdoor settings.

The luminance signal Y from summing amplifier 61 is provided to the positive terminal of a comparator 71, which has a brightness threshold TH1 set at its negative terminal. The output of comparator 71 is provided to controller 27, which uses the signal for the light/dark indication used in steps S12 and S22 of method M1.

Luminance signal Y is also input to the positive input of a comparator 73, which has a second brightness threshold TH2 at its negative input. Threshold TH2 is set above normal brightness levels for indoor lighting but below the level of ambient light that would wash out the panel lighting. Note that if color temperature is not used for indoor/outdoor detection, light sensor S1 need not be a visible light sensor; for example, it can be an infrared light detector.

Vending machine AP1 uses the resulting bright/dim indication in one automatic mode of location detection. A signal from timer 29 is used to indicate noon. At noon the value of the bright/dim indication is latched for 24 hours, in effect, setting an indoor/outdoor flag 81 of controller 27. Note that the bright/dark TH2 could also be used for the outdoor bright indication in step S22, while threshold TH1 is used in step S21.

Chrominance signal C is input to the positive terminal of a comparator 75, which compares it with a chrominance threshold TH3 to provide a blue/nonblue indication to flag 81. In one auto-locator mode, a "blue" indication is used to indicate an outdoor location, while "nonblue" is used to indicate an indoor location. Alternatively, a combination of the blue/nonblue and the bright/dim indications can be used to determine location.

The present invention has industrial applicability to the manufacture of "green" appliances, including refrigerated vending machines. Many different schemes for determining location, occupancy, and time can be used. Also, the invention need not turn off all panel lighting; for example, a small LED could be left on to indicate "sleep" mode. These and other variations upon and modifications to the described embodiments are provided for by the present invention, which is defined by the following claims.

What is claimed is:

1. A power-control system for controlling power to a load, said system comprising:
   a locator for providing location indications that distinguish between an indoor environment and outdoor environment;
   a light sensor for providing brightness indications distinguishing bright and dark conditions;
   a controller for controlling power to said load as a function of location indications and said brightness indications so that:
      power is withheld from said load while outdoor and bright conditions are concurrently indicated;
      power is provided to said load while indoor and bright conditions are concurrently indicated; and
      power is provided to said load while outdoor and dark conditions are concurrently indicated.

2. A system as recited in claim 1 wherein power is withheld from said load while indoor and dark conditions are indicated.

3. A system as recited in claim 1 further comprising:
   an occupancy sensor for providing occupancy indications distinguishing between occupancy and vacancy conditions; and
   a timer for providing vacancy-time indications distinguishing between a short-vacancy condition and a long-vacancy condition, said timer being functionally coupled to said occupancy sensor for receiving said occupancy indications therefrom;
   said controller withholding power from said load while said indoor condition and said long-vacancy condition are concurrently indicated.

4. A system as recited in claim 1, 2, or 3 wherein said locator distinguishes between said indoor condition and said outdoor condition as a fixed function of a setting entered by a human operator.

5. A system as recited in claims 1, 2, or 3 wherein said locator distinguishes said indoor condition and said outdoor condition at least in part as function of light intensity during said bright condition.

6. A system as recited in claims 1, 2, or 3 wherein said locator distinguishes said indoor condition and said outdoor condition at least in part as a function of color temperature during said bright condition.

7. A vending machine comprising:
   a mechanism for dispensing items;
   panel lights;
   a locator for providing location indications that distinguish between an indoor environment and outdoor environment;
   a light sensor for providing brightness indications distinguishing bright and dark conditions;
   a controller for controlling power to said lights as a function of location indications and said brightness indications so that:
      power is withheld from said lights while outdoor and bright conditions are concurrently indicated;
      power is provided to said lights while outdoor and dark conditions are concurrently indicated; and
      power is provided to said lights while indoor and bright conditions are concurrently indicated.

8. A vending machine as recited in claim 7 wherein power is withheld from said lights when indoor and dark conditions are indicated.

9. A vending machine as recited in claim 7 further comprising:
   an occupancy sensor for providing occupancy indications distinguishing between occupancy and vacancy conditions; and
   a timer for providing vacancy-time indications distinguishing between a short-vacancy condition and a long-vacancy condition, said timer being functionally coupled to said occupancy sensor for receiving said occupancy indications therefrom;
   said controller withholding power from said lights while said indoor condition and said long-vacancy condition are concurrently indicated.

10. A vending machine as recited in claims 7, 8, or 9 wherein said locator distinguishes between said indoor condition and said outdoor condition as a fixed function of a setting entered by a human operator.

11. A vending machine as recited in claims 7, 8, or 9 wherein said locator distinguishes said indoor condition and said outdoor condition at least in part as function of light intensity during said bright condition.

12. A vending machine as recited in claims 7, 8, or 9 wherein said locator distinguishes said indoor condition and said outdoor condition at least in part as a function of color temperature during said bright condition.

13. A vending machine as recited in claims 7, 8, or 9 further comprising a cooling system including a compressor for regulating the temperature of vending items stored in said vending machine, said controller controlling said compressor and said panel lights so that either can be on while the other is off during both indoor and outdoor conditions.

14. A method comprising:
    indicating whether a system is indoors or outdoors;
    indicating whether conditions are bright or dark according to a predetermined criterion;
    withholding power from a load while outdoor and bright conditions are concurrently indicated;
    providing power to said load while indoor and bright conditions are concurrently indicated; and
    providing power to said load while outdoor and dark conditions are concurrently indicated.

15. A method as recited in claim 14 further comprising withholding power is from said load while indoor and dark conditions are indicated.

16. A method as recited in claim 14 further comprising:
    providing a long-vacancy indication when a vicinity has been vacant for some predetermined time; and
    withholding power from said load while said indoor condition is indicated and said long-vacancy indication is provided.

17. A method as recited in claims 14, 15, or 16 further comprising a step of a human operator setting said location indication.

18. A method as recited in claims 14, 15, or 16 wherein said location indication is determined at least in part as a function of light intensity during said bright condition.

19. A method as recited in claims 14, 15, or 16 wherein said location indication is determined at least in part as a function of color temperature during said bright conditions.

20. A method comprising:
    indicating whether a vending machine is indoors or outdoors;
    indicating whether conditions are bright or dark according to a predetermined criterion;
    withholding power from a panel lights of said vending machine while outdoor and bright conditions are concurrently indicated;
    providing power to said lights while outdoor and dark conditions are concurrently indicated; and
    providing power to said lights while indoor and bright conditions are concurrently indicated.

21. A method as recited in claim 20 further comprising:
    withholding power is from said lights while indoor and dark conditions are indicated.

22. A method as recited in claim 20 further comprising:
    providing a long vacancy indication when a vicinity has been vacant for some predetermined time; and
    withholding power from said lights while said indoor condition is indicated and said long-vacancy indication is provided.

23. A method as recited in claims 20, 21, or 22 further comprising a step of a human operator setting said location indication.

24. A method as recited in claims 20, 21, or 22 wherein said location indication is determined at least in part as a function of light intensity during said bright condition.

25. A method as recited in claims 20, 21, or 22 wherein said location indication is determined at least in part as a function of color temperature during said bright condition.

26. A method as recited in claims 20, 21, or 22 further comprising regulating the temperature of vending items stored in said vending machine by activating and deactivating a compressor in dark and light conditions during both indoor and outdoor conditions.

* * * * *